US006941025B2

(12) United States Patent
Greenfield et al.

(10) Patent No.: US 6,941,025 B2
(45) Date of Patent: Sep. 6, 2005

(54) SIMULTANEOUS VERTICAL SPATIAL FILTERING AND CHROMA CONVERSION IN VIDEO IMAGES

(75) Inventors: James D. Greenfield, Binghamton, NJ (US); Agnes Y. Ngai, Endwell, NY (US); John M. Sutton, Endicott, NY (US); Edward F. Westermann, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 09/838,758

(22) Filed: Apr. 19, 2001

(65) Prior Publication Data

US 2002/0163594 A1 Nov. 7, 2002

(51) Int. Cl.[7] .............................. G06K 9/40; G06K 9/32; H04N 1/46
(52) U.S. Cl. ....................... 382/260; 382/274; 382/300; 358/505
(58) Field of Search ................................ 382/260, 261, 382/262, 263, 264, 265, 274, 275, 300, 305, 307, 318; 348/237; 358/505, 474, 486

(56) References Cited

U.S. PATENT DOCUMENTS

| 4,602,285 A | | 7/1986 | Beaulier et al. |
|---|---|---|---|
| 4,897,770 A | | 1/1990 | Solomon |
| 4,903,122 A | * | 2/1990 | Ozaki et al. ................. 348/237 |
| 4,958,265 A | | 9/1990 | Solomon |
| 5,313,281 A | | 5/1994 | Richards |
| 5,561,723 A | | 10/1996 | DesJardins et al. |
| 5,773,814 A | * | 6/1998 | Phillips et al. ............ 250/208.1 |
| 5,991,456 A | | 11/1999 | Rahman et al. |
| 6,226,401 B1 | * | 5/2001 | Yamafuji et al. ............ 382/165 |
| 6,285,801 B1 | * | 9/2001 | Mancuso et al. ............ 382/268 |
| 6,631,206 B1 | * | 10/2003 | Cheng et al. ................ 382/164 |

OTHER PUBLICATIONS

Jin Li, "Image Compression– the Mechanics of the JPEG 2000", Microsoft Research, Signal Processing, 2000, pp. 1–18.*

* cited by examiner

*Primary Examiner*—Mehrdad Dastouri
(74) *Attorney, Agent, or Firm*—Whitham, Curtis & Christofferson, P.C.; William H. Steinberg

(57) ABSTRACT

Simultaneous vertical spatial filtering and chrominance conversion is achieved with reduced data buffering and simplified filtering circuits by using a single filter stage and hybrid filter coefficients. Data latency is reduced and performance requirements are reduced while avoiding critical signal propagation paths. The filter and buffers are fully compatible with any scan format having consecutively presented lines of image data, including both progressive and interlaced scan formats.

8 Claims, 3 Drawing Sheets

SIMULTANEOUS VERTICAL SPATIAL FILTERING AND CHROMA CONVERSION IN VIDEO IMAGES

BACKGROUND OF THE INVENTION

1. Field of the Invention

The present invention generally relates to compression of image data and, more particularly, to preprocessing of video image data to improve compression efficiency by vertical spatial filtering and chroma conversion.

2. Description of the Prior Art

Processing of data in digital form is rapidly becoming substantially universal for a number of reasons including, but not limited to, comparatively much lower cost of digital circuitry, noise immunity, reliability of storage, error recovery and fidelity of retrieved or replicated data. Nevertheless, the volume of digitized data from effectively analog sources may be very large to the point of compromising the capability of performing desired processing, including transmission and storage, within required time periods and/or with available resources. One of the most data volume intensive data processing activities is the transmission and/or storage and retrieval of image data. Time periods are particularly critical for video data which must be processed within rapid frame rates to maintain the illusion of motion.

The only feasible solution to reducing data processing time with given data processing resources is to reduce data volume. It is often possible to greatly reduce the volume of image or video data without significantly perceptible degradation of the image(s) and sophisticated and flexible standards have been developed which support any arbitrary degree of image data compression with minimized loss of image fidelity for the volume of data that can be accommodated. For example, the Joint Photographic Experts Group (JPEG) has developed a widely adopted standard for compression of still image data. Similarly, the Moving Picture Experts Group (MPEG) has developed a standard employing similar principles to the JPEG standard but additionally exploiting frame-to-frame redundancy to accommodate the more stringent time requirements for processing of video data. However, efficiency of compression processing is not guaranteed under either standard.

Therefore, various techniques of data pre-processing are often employed in order to improve data compression efficiency, particularly for low bit rate applications. Typically, these pre-processing functions include horizontal spatial filtering, vertical spatial filtering, temporal filtering, 4:2:2 to 4:2:0 chroma conversion and many others. More than one of these techniques is often applied to image or video data together, in sequence, prior to compression. Since most image data is digitized in accordance with a raster format, buffers are usually required by any of these processes in order to accumulate the minimum amount of data which must be simultaneously available to support performance of the desired pre-processing function. For example, only a very small buffer is generally required for horizontal spatial filtering because images are generally digitized by accordance with horizontal raster lines and the horizontal filtering is usually performed over a relatively small number of pixels in a single raster line.

However, much larger buffers may be required for other pre-processing functions. For example, vertical spatial filtering and chroma conversion require storage of multiple raster lines of the image and multiple transfer paths through the respective stages of the buffer. Such buffer storage may be considered as a delay line with multiple taps to simultaneously provide image value data on which the pre-processing is performed. The size of the buffer is related to the number of taps required for a particular pre-processing function. For example, a four tap filter as might be employed for vertical spatial filtering requires storage for three full lines of data. Interleaved scan rasters generally require separate buffers for odd and even fields, respectively.

Accordingly, it is seen that substantial storage hardware may be required when certain types of preprocessing are performed. Further, when more than one preprocessing operation is performed, sufficient buffers must be provided for each individual process for progressive scan patterns and must generally be doubled to accommodate interleaved scans. This amount of hardware, itself, presents problems in data handling since the pre-processing operations are generally performed serially in a pipelined fashion. Therefore, in addition to the pre-processing circuits, each of which has a finite and often substantial signal propagation time, further circuits for transfer and reclocking of signals must be provided between the preprocessing circuits; further increasing signal propagation time and often engendering critical paths through the full pre-processing circuit arrangement. Therefore, extremely high levels of performance of each individual stage of the preprocessing circuitry and the data interconnections between them is required at the current state of the art.

SUMMARY OF THE INVENTION

It is therefore an object of the present invention to provide a pre-processing circuit for simultaneous vertical spatial filtering and chroma conversion allowing reduction of buffer hardware.

It is another object of the invention to provide a preprocessing arrangement in which circuit performance requirements are reduced in performing vertical spatial filtering and chroma conversion.

It is a further object of the invention to provide a pre-processing arrangement for performing vertical spatial filtering and chroma conversion for either progressive or interleaved scan data format In order to accomplish these and other objects of the invention, a method of pre-processing image data is provided including steps of applying luminance and chrominance data of consecutively presented lines of data to respective data inputs of a filter, and applying hybrid filter coefficients to the filter to concurrently obtain spatially filtered and chrominance converted data.

In accordance with another aspect of the invention, a preprocessing circuit is provided including a filter having inputs to receive luminance and chrominance data corresponding to consecutive image data lines, and an arrangement for applying hybrid filter coefficients to the filter such that spatially filtered and chrominance converted data are concurrently developed by the filter.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
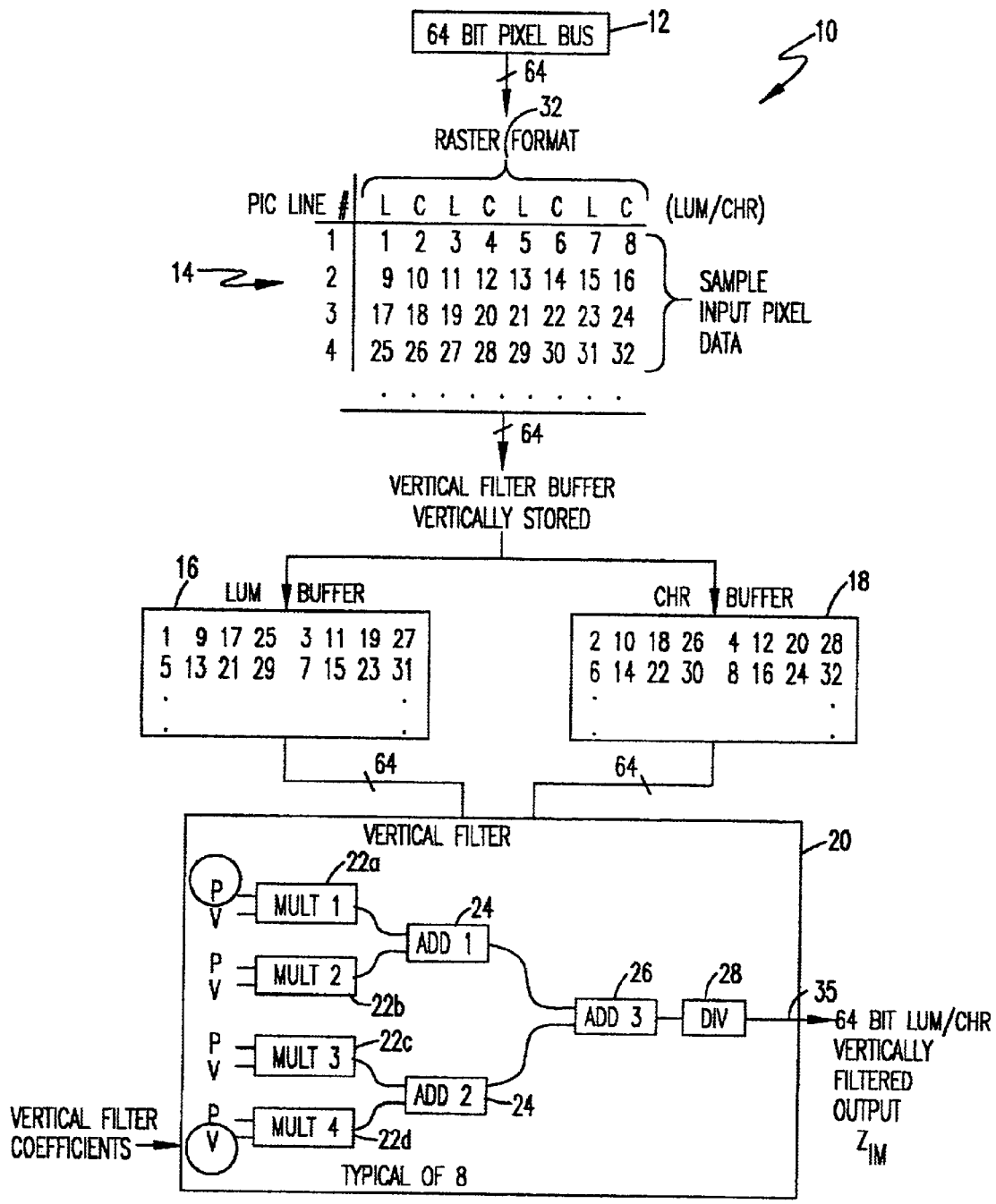
FIG. 1 is a schematic block diagram of an exemplary vertical spatial filtering circuit.
Figure 2:
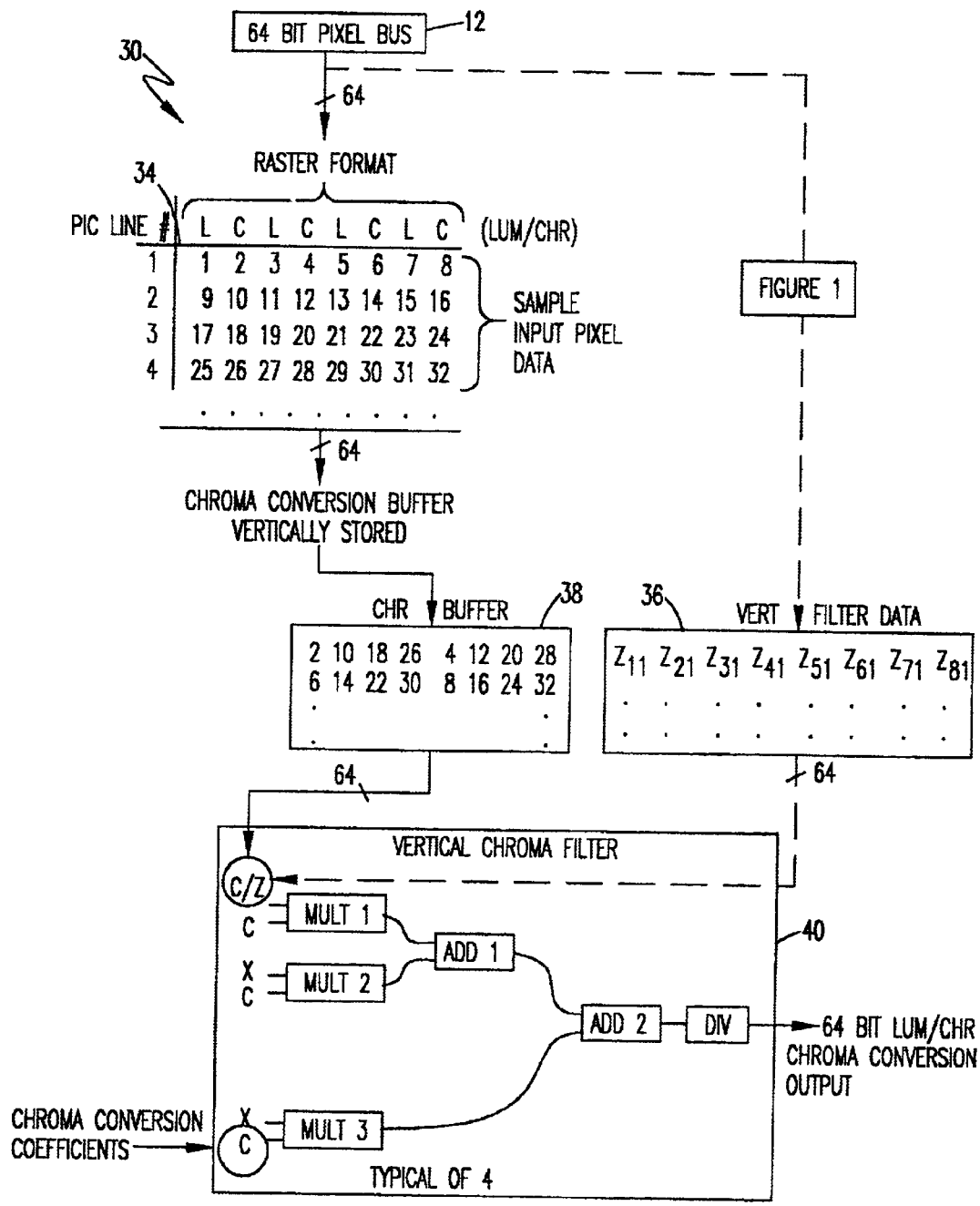
FIG. 2 is a schematic block diagram of an exemplary chroma conversion circuit.

Referring now to the drawings, and more particularly to FIG. 1, there is shown a schematic representation of an exemplary vertical spatial filtering circuit. FIG. 2 shows an exemplary chroma conversion circuit including modifications generally provided when the chroma conversion circuit is to be pipelined with a vertical filtering circuit. It is to be understood that these Figures are provided and the depiction arranged to facilitate an appreciation and understanding of the invention and that no part of either FIG. 1 or FIG. 2 is admitted to be prior art in regard to the present invention. Accordingly, FIGS. 1 and 2 have been designated "Related Art".

FIG. 1 is a schematic block diagram of an exemplary vertical spatial filtering circuit 10. The function of the vertical filtering circuit is to reduce the difference in pixel image values (e.g. luminance and chrominance) between vertically adjacent pixels in a group of two or more (four being illustrated) so that compression in accordance with differences in these values will result in smaller numbers in order to increase efficiency of compression with little perceptible effect on image fidelity. In fact, the smoothing of image values in this way largely removes noise which can result in very large differences in image values between adjacent pixels and, in practice, severe compromise of compression efficiency. The filtering largely prevents degradation of the image by noise that is, in general, more severe and more perceptible than degradation due to filtering, if appropriate filtering coefficients are chosen.

It will be assumed for simplicity and clarity in the following discussion of FIGS. 1 and 2 that individual pixels are represented by pairs of luminance and chrominance data in respective pairs of bytes (e.g. 1 (luminance) and 2 (chrominance), 3 and 4, 5 and 6, etc.). For simplicity and clarity of illustration, only four pixels, each represented by a pair of luminance and chrominance bytes are shown in each line of vertical filter buffer 14 but which, in fact, correspond to the parallel transmission over pixel bus 12 which, for convenience, is sixty-four bits wide.

Thus groups of sixty-four parallel bits representing two bytes for each of four pixels are simultaneously transmitted over pixel bus 12 and sequentially loaded into vertical filter buffer 14 to build up respective lines of data depending on the number of pixels in a line in a given picture/frame format which may be arbitrarily chosen. It should be understood that articulation of the image into blocks of arbitrary dimensions is also possible and may, in fact, yield substantial reductions in overall hardware requirements by multiplexing of the blocks, as will be evident to those skilled in the art in view of this discussion of the invention.

When each line is completed, a following line of pixels is accumulated in the same manner to store pixel data in raster format. The vertical size or dimension of the vertical filter buffer is chosen based on the filtering function to be performed which will, in turn, determine the number of taps required and the number of stages in the vertical direction to supply pixel data to the respective taps. The architecture of the vertical filter buffer 14 is, functionally, a plurality of parallel shift registers having a stage for each line of the image and the plurality of shift registers being equal in number to the number of pixels in each line multiplied by the number of image parameters employed to represent the image value of each pixel; in this case the luminance and chrominance bytes. An input stage of each functional shift register receives pixel data from pixel bus 12 and the lines of data are shifted from stage to stage of the functional shift registers in the vertical filter buffer 14 as the data is output and data is eventually discarded.

While not of importance to the practice of the invention in accordance with its basic principles, synchronous operation of the vertical filter buffer 14 is preferred for hardware economy and will be assumed for purposes of this discussion. Therefore, sixty-four bits (eight bytes) must be output for each sixty-four bits (eight bytes) of input, although the clock phase may be set in any manner convenient to the hardware articulation. Generally, multiplexing of blocks in the line direction will greatly increase operating margins in this regard. Upon such read out, luminance and chrominance data is functionally separated as schematically depicted by separate luminance and chrominance buffers 16, 18, respectively, although such additional buffers are not necessary and are depicted only for purposes of explanation of the invention. It should be noted that the respective luminance and chrominance pixel image values of each pixel now appear in separate buffers and four byte sequences of image values along rows in buffers 16, 18 correspond to columns of image values in vertical filter buffer 14. These four byte sequences of values are read out of buffers 16, 18 simultaneously and in parallel to the P inputs of vertical filter 20. Since the data is now one hundred twenty-eight bits (sixteen bytes) wide, the data transfer rate is reduced (by half in this case) to allow additional processing time in the vertical filter; principally the multipliers 22a–22d which are preferably of an unsigned eight bit by signed nine bit configuration. That is, sixteen bits of luminance and chrominance data (e.g. eight bits each) is output to a single input of each multiplier that has, in this case, four inputs in order to filter over a vertical group of four pixels to obtain a filtered value, Z, corresponding to a location in the original image data having a resolution corresponding to a single pixel. Eight vertical filters 20 correspond to the 128 bit width of the data.

For the vertical filtering function, the vertical filter coefficients, V, will generally be a constant signed nine bit value and can be input directly to or set within the multipliers 22a–22d. Alternatively, some arrangement for evaluating pixel values and altering filter coefficients could be provided as will be evident to those skilled in the art within the basic principles of the invention. The function of the multipliers is to transform the image values of the luminance and chrominance values in accordance with a weight specified by the filter function to which the vertical filter coefficients correspond. These resulting weighted image values are then summed in as many stages as may be required by the vertical filter function. In the exemplary case illustrated, the number, N, of vertically adjacent pixels is four and two stages of adders 24, 26 is sufficient to the summation. The result is then divided by divider 28 to normalize the output value of $Z_{lm}$ as a sixty-four bit luminance/chrominance filtered value.

FIG. 2 is a schematic block diagram of an exemplary chrominance conversion circuit 30 which is, for simplicity and clarity, depicted in an architecturally similar fashion to the vertical filter of FIG. 1. Data transfer between the chroma conversion buffer 34 and luminance and chrominance buffer 38 is identical to that between vertical filter buffer 14 and luminance and chrominance buffers 16, 18 described above except that the luminance buffer 16 is not used. Likewise, data transfer and input to the vertical chroma conversion filter 40 is precisely the same as that described above. However, it should be understood that only four filters are required (corresponding to the 64-bit input and reduced numbers of filtered chrominance values generally desired) and while the architecture and function of the vertical chroma conversion filter is the same as the vertical spatial filter described above, the individual chrominance values can be differently routed to particular filters in accordance with a desired filter function.

It should be understood that the foregoing description corresponds to a stand-alone vertical chrominance filter which could be pipelined with a vertical spatial filter such as that of FIG. 1 by configuring register 34 as an extension of register 14 of FIG. 1. However, this requires the buffer capacity to be the sum of the number of lines of pixel data required for each of the two processes; in this case, seven lines or, for an exemplary 720×480 format, 5040 (7 rows× 720 pixels) bytes or, at the bit level, 5760 seven-stage shift registers. Pipelining with a vertical spatial filter 10 can also be accomplished in a computationally and, often, functionally preferable manner by buffering the outputs of FIG. 1 in buffer 36 rather than including buffers 34 and 38 since the vertically filtered data includes chrominance information and the luminance and chrominance are maintained distinct therein. (It should be understood, in this regard, that buffers 16 and 18 in FIG. 1 are not necessary and are illustrated to show separation of luminance and chrominance data, as noted above. Similarly, buffer 38 is not necessary but is illustrated for correspondence with FIG. 1.)

However, it should be recalled that there is a one-to-one correspondence of the filtered Z values with the pixels in a line of the image and the required capacity of buffer 36 is precisely the same as that of buffer 34. Therefore, while possibly preferable for other reasons, chroma conversion using the filtered Z values does not yield any hardware economy in regard to required storage for image values. Reduction of both hardware storage requirements and filter circuits achieved by the invention will now be discussed.

For purposes of the following description of the invention, it is assumed that the input picture (scan) format is progressive and the image size is 720×480 pixels and that all coefficients are normalized to 1. It will be further assumed that the filter results are all within the valid data range and saturation is not required. A four tap filter is assumed to be used for vertical spatial filtering and a three tap filter is assumed to be used for chroma conversion, as was assumed in the discussion of FIGS. 1 and 2 above.

Let $P_{rc}$ be the pixel data of an input picture, where $1 \leq r \leq 480$ and $1 \leq c \leq 720$ denote the pixel location within the picture. Let $V_j$ be the vertical spatial filter coefficients where $1 \leq j \leq 4$ denotes one of the four vertical spatial filter taps. Let $C_k$ be the chroma conversion filter coefficients where $1 \leq k \leq 3$ denotes one of the three chroma filter taps. In a conventional (e.g. pipelined) design, vertical spatial filtering is carried out prior to chroma conversion. The output of the vertical spatial filter, $Z_{lm}=\text{sum } P_{rc}V_j/N$, where N is the normalization divisor and l represents the row and m represents the column of the filtered pixels in the picture. Thus, (as a mathematical expression for the vertical spatial filter function described above) for l=1 to 6 and m=1, the equation for $Z_{lm}$ becomes:

$$Z_{11}=P_{11}V_1+P_{21}V_2+P_{31}V_3+P_{41}V_4$$

$$Z_{21}=P_{21}V_1+P_{31}V_2+P_{41}V_3+P_{51}V_4$$

$$Z_{31}=P_{31}V_1+P_{41}V_2+P_{51}V_3+P_{61}V_4$$

$$Z_{41}=P_{41}V_1+P_{51}V_2+P_{61}V_3+P_{71}V_4$$

$$Z_{51}=P_{51}V_1+P_{61}V_2+P_{71}V_3+P_{81}V_4$$

$$Z_{61}=P_{61}V_1+P_{71}V_2+P_{81}V_3+P_{91}V_4 \ldots$$

When the 4:2:2 to 4:2:0 chroma conversion is applied in a pipelined fashion to the output values of the vertical spatial filter, $Z_{lm}$, $X_{no}$ is generated where n is the row location and o is the column location and is defined as $X_{no}=\text{sum } Z_{lm}C_k/N$. Thus, (as a mathematical description of the operation of FIG. 2 using buffer 36, as described above)

$$X_{11}=Z_{11}C_1+Z_{21}C_2+Z_{31}C_3$$

$$X_{21}=Z_{21}C_1+Z_{31}C_2+Z_{41}C_3$$

$$X_{31}=Z_{31}C_1+Z_{41}C_2+Z_{51}C_3$$

$$X_{41}=Z_{41}C_1+Z_{51}C_2+Z_{61}C_3 \ldots$$

When $Z_{lm}$ is substituted, these equations become:

$$X_{11}=P_{11}V_1C_1+P_{21}(V_2C_1+V_1C_2)+P_{31}(V_3C_1+V_2C_2+V_1C_3)$$
$$+P_{41}(V_4C_1+V_3C_2+V_2C_3)+P_{51}(V_4C_2+V_3C_3)+P_{61}V_4C_3$$

$X_{21}$ is dropped by the down sampling function $$X_{31}=P_{31}V_1C_1+P_{41}(V_2C_1+V_1C_2)+P_{51}(V_3C_1+V_2C_2+V_1C_3)$$
$$+P_{61}(V_4C_1+V_3C_2+V_2C_3)+P_{71}(V_4C_2+V_3C_3)+P_{81}V_4C_3$$

$X_{41}$ is dropped by the down sampling function . . .

Thus it is seen that the two functions of vertical spatial sampling and chroma conversion can be combined into a single process and performed by a single filter using a single group of buffers. However, this combined filter requires more taps than either the vertical spatial filter or the chroma conversion filter as can be seen from the subscripts of the P values in the equation for $X_{11}$ or $X_{31}$ indicating a need for data corresponding to six pixel rows.

Nevertheless, the two end coefficients (requiring data for rows 1 and 6 for $X_{11}$ or 3 and 8 for $X_{31}$) generally carry the smallest weights and the remainder of the weights can be adjusted so that the end weights are zero. Therefore, the combined filter can be accomplished with a buffer arrangement having only four taps, corresponding to a buffer capacity of only three lines; less than or the same as the buffer capacity required to support the vertical spatial filter function alone in a sequential or pipelined arrangement. Thus, the additional buffering capacity required for chroma conversion in a sequential or pipelined arrangement can be eliminated. The taps provide image pixel luminance and chrominance values to filter 120 including multipliers 130a–130d for weighting the values in accordance with hybrid/combined VC coefficients (so-called hereinafter since they are mathematical combinations of the V and C coefficients discussed above for the separate processing of FIGS. 1 and 2, respectively) which are then summed by adders 140, 150 and the sum normalized by divider 160.

In this regard, it should be appreciated that while the image data for the first pixel row will, for simplicity of circuitry, be allowed to pass through buffer 14 in the same manner as other data and will be used for vertical filtering of luminance data, when the first through fourth lines of image data are present, both luminance and chrominance filtered data will be available corresponding to the first pixel row or line when the second through fifth lines of image data are available. However, this timing represents a reduction rather than an increase in data latency since the converted chroma data would not be produced until the seventh line of image data was buffered in the sequential or pipelined arrangement of FIGS. 1 and 2 regardless of which of the P or Z values are used.

It should also be appreciated that while vertical filtering of luminance data is performed for each line of image data, converted chrominance data is only provided for every other line of the image data and is thus referred to as downsampling in the discussion of the derivation of $X_{21}$ and $X_{41}$ values above and need not be calculated. As a practical matter, however, switching of data (and coefficients) at the input of the filter circuit and controlling portions of the filter circuit to avoid calculation of the unnecessary converted chrominance values would be complex and generally would engender timing problems. Therefore, chrominance conversion is calculated for all lines and the unused values simply dropped for odd or even pixel lines, as schematically indicated by blocking with AND gate 170. A simple line counter circuit can be used for determining the lines to be blocked or dropped.

Additionally, it can be appreciated that the various sums of products of $V_j$ and $C_k$ are lumped coefficients which can be calculated or empirically determined and are thus fewer than the number of coefficients which must be used in sequential or pipelined arrangements. It follows that the number of filtering circuits, including multipliers, adders and dividers, is reduced by one-third in this example; further reducing hardware requirements. Perhaps more importantly, the number and nature of the elements of the signal propagation path is limited to the elements required for a single filtering process and no data transfer or reclocking circuitry is required since there is no pipeline. Therefore, no critical paths are generated and circuit performance requirements, in terms of signal propagation time through preprocessing circuits are substantially relaxed.

Figure 3:
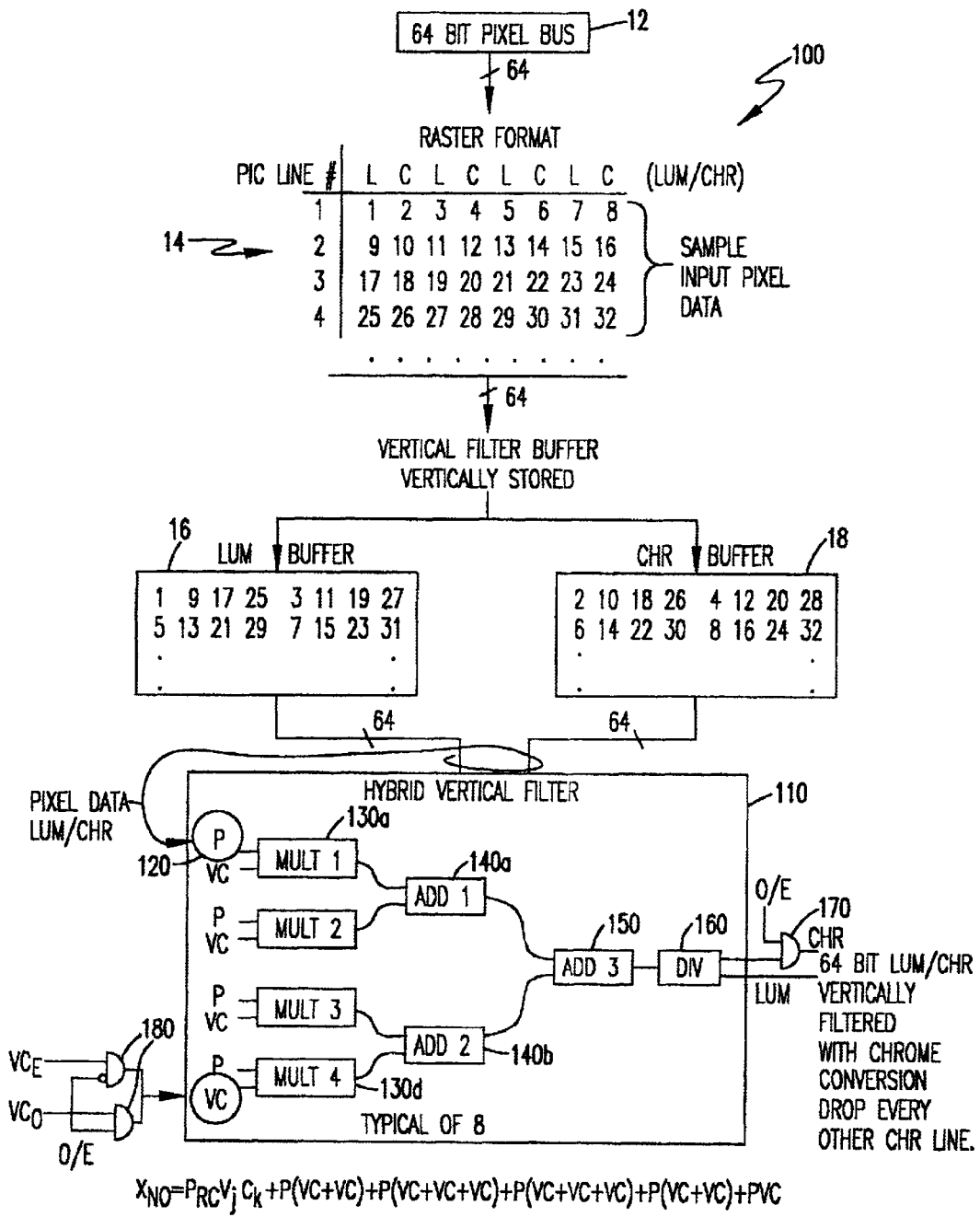
FIG. 3 is a simplified schematic block diagram of a preprocessing circuit for simultaneously performing vertical spatial filtering and chroma conversion in accordance with the invention.

Referring now to FIG. 3, a hardware architecture implementation of the invention will now be discussed. It should be appreciated that this architecture is substantially similar to that of FIG. 1 and many particulars discussed above need not be repeated. Viewed in another way, substantially the same hardware required for vertically spatial filtering data can produce the result of both vertical spatial filtering and chroma conversion with reduced latency. As with the arrangement of FIG. 1, data is provided from pixel bus 12 to buffer 14 and separated into luminance and chrominance data as indicated at 16, 18, although, as indicated above, physical separation or additional buffering is not required. Hybrid vertical filter 110 is also of somewhat similar architecture to that of FIG. 1 but may also contain some gating structures to control input of image data and/or V, C and/or VC coefficients and/or output, such as the blocking of converted chrominance values as discussed above or, alternatively, using the V coefficients instead of the VC coefficients for alternate lines of image data. Details of such gating are not important to the principles or successful practice of the invention. As demonstrated above, all that is necessary to achieve the meritorious effects of the invention is to supply the combined filter coefficients $V_n C_n$ to the filter along with the luminance and chrominance data to obtain data which has been both vertically spatial filtered and vertically chrominance converted. Any desired control of the filter circuit in accordance with the invention can be done in numerous ways that will be evident to those skilled in the art in view of the above discussion.

In practice, the input picture can be either progressive or interlaced; the latter having odd and even fields comprising odd and even pixel lines, respectively. In theory, as noted above and prior to the present invention, sufficient buffers were required for each individual process for progressive scan patterns and buffers generally could be made larger to accommodate interleaved scans. It is also possible to provide dedicated filters (including buffers) for odd and even fields. However, it is not practical to buffer an entire field and filtering between fields has not been found to yield and particular benefit that would justify doing so and any desired change in scan format would be done downstream from the filter.

Therefore, while the invention was described above assuming a progressive scan format, it can be applied equally and without need for modification or alteration of buffer configuration or capacity to an interlaced scan format. Processing for one odd or even field will be complete before data for the next field is introduced into the buffer. In general, slightly different coefficients, $VC_o$, $VC_e$, will be used for the odd and even fields which can be gated at the filter input as schematically shown at 180 of FIG. 3 but the data of the odd and even fields are preferably not mixed. That is, it is preferred to perform filtering and chrominance conversion on consecutively presented lines of data regardless of whether the scan format is progressive or interlaced.

The coefficients can also be rapidly changed, at will, in correspondence with the processing of an odd or even field either by selective enablement of digital multipliers and adders containing the respective groups of coefficients respectively corresponding to the odd and even fields or the same physical hardware circuits could be used for both fields by simply rewriting coefficients between fields. Therefore, the same buffer can be used for progressive format data or interlaced format data.

In view of the foregoing, it is seen that the invention provides simultaneous vertical spatial filtering and chroma conversion with simplified circuitry and reduced storage requirements. Additionally, since pipelining is avoided, performance requirements of the filter circuitry are substantially relaxed and critical paths and/or reclocking and transfer circuitry are avoided.

While the invention has been described in terms of a single preferred embodiment, those skilled in the art will recognize that the invention can be practiced with modification within the spirit and scope of the appended claims.

What is claimed is:

1. A method of pre-processing image data, said method including steps of
    buffering and applying luminance and chrominance data of consecutively presented lines of data to respective data inputs of a filter,
    applying hybrid filter coefficients to said filter for concurrently and simultaneously filtering said luminance and chrominance data to concurrently and simultaneously develop vertically spatially filtered and chrominance converted data, and
    removing alternate lines of said chrominance converted data,
wherein said filtering comprises steps of
    multiplying said luminance and chrominance data by said hybrid filter coefficients for respective ones of said consecutively presented lines to produce weighted luminance and chrominance values, and
    summing said weighted luminance and chrominance values.

2. A method as recited in claim 1, wherein said consecutively presented lines are lines of a progressive scan format.

3. A method as recited in claim 1, wherein said consecutively presented lines are lines of an odd field or an even field of an interlaced scan format.

4. A method as recited in claim 3, further including a step of
- altering said hybrid filter coefficients for respective ones of said odd field and said even field.

5. A pre-processing circuit for image data including
- a filter having inputs to receive luminance and chrominance data corresponding to consecutive image data lines,
- a buffer for storing said consecutive lines of said image data and outputting said image data to said filter,
- means for applying hybrid filter coefficients to said filter such that vertically spatially filtered and chrominance converted data are concurrently and simultaneously developed by said filter,
- means for multiplying said luminance and chrominance data by said hybrid filter coefficients for respective ones of said consecutively presented lines to produce weighted luminance and chrominance values,
- means for summing said weighted luminance and chrominance values, and means for sub-sampling said chrominance converted data.

6. A pre-processing circuit as recited in claim 5, wherein said consecutive image data lines correspond to a progressive scan format.

7. A pre-processing circuit as recited in claim 5, wherein said consecutive image data lines correspond to and odd field or an even field of an interlaced scan format.

8. A pre-processing circuit as recited in claim 7, further including
- means for altering said hybrid filter coefficients for respective ones of said odd field and said even field.

* * * * *